United States Patent [19]

Levillain

[11] Patent Number: 4,860,832
[45] Date of Patent: Aug. 29, 1989

[54] RECEPTACLE FOR EXTINGUISHING A BURNING LIQUID FUEL BY ISOLATION

[75] Inventor: Claude Levillain, Aix en Provence, France

[73] Assignee: Commissariat a l'Energie Atomique, Paris, France

[21] Appl. No.: 126,127

[22] Filed: Nov. 27, 1987

[30] Foreign Application Priority Data

Dec. 8, 1986 [FR] France .................. 86 17122

[51] Int. Cl.$^4$ .................................................. A62C 7/00
[52] U.S. Cl. ........................................ 169/49; 169/48; 169/54; 376/279; 137/449; 220/209
[58] Field of Search ...................... 169/48–50, 169/54; 137/397–398, 449; 220/203, 205, 209; 376/279, 277

[56] References Cited

U.S. PATENT DOCUMENTS

| 2,796,883 | 6/1957 | Thompson | 137/449 |
| 3,871,459 | 3/1975 | Falgayrettes | 169/49 |
| 4,356,869 | 11/1982 | Buttrey | 169/49 |

FOREIGN PATENT DOCUMENTS 857356  9/1940  France .................. 169/49

OTHER PUBLICATIONS

R. N. Newman et al., "Intallations for the Suppression of Sodium Fires", Nuclear Energy 1979, vol. 18, Oct., No. 5, pp. 343–347.

Primary Examiner—Joseph F. Peters, Jr.
Assistant Examiner—Gregory R. Poindexter
Attorney, Agent, or Firm—James E. Nilles; Donald C. McGaughey

[57] ABSTRACT

A receptacle comprises a plurality of juxtaposed tanks interconnected adjacent upper portions thereof in liquid communication with each other by eyelets defining liquid transmitting passages. Each of the tanks has an open top closed by a funnel shaped cover having a central opening for admitting burning liquid fuel. Spheres are suspended from the covers to normally seal the liquid transmitting passages with the spheres each having a density which will permit them to float on the liquid fuel when it rises to the level of the passage to thereby open the passage.

9 Claims, 5 Drawing Sheets

RECEPTACLE FOR EXTINGUISHING A BURNING LIQUID FUEL BY ISOLATION

The invention relates to a receptacle designed for extinguishing by isolation a burning liquid fuel introduced into said receptacle.

The invention is applicable to all industrial sectors in which large volumes of liquid fuel are used or produced. This situation frequently occurs in the chemical industry and in plants for the production and processing of hydrocarbons. It also occurs in fast neutron nuclear reactors in which a large volume of liquid sodium at high temperature is used as the heat transfer fluid in the primary circuit and in the secondary circuit of the reactor. In all these applications, fire risks are an important problem.

A known solution of this problem described in FR-A-2 319 392 relates to a receptacle incorporating a tank designed for receiving the burning liquid fuel and for rapidly extinguishing said fuel by isolating it from the ambient air. This tank is closed by a cover in which are formed liquid fuel admission openings, which are normally sealed by flaps, whose moving aside is controlled by the arrival of the liquid fuel on the tank cover.

FR-A-2 357 267 describes an improvement to said apparatus making it possible to collect a burning liquid fuel volume larger than the internal volume of the tank. To this end, several tanks identical to that described hereinbefore are juxtaposed and joined to one another and communicate in pairs, e.g. via pipes having no sealing system, or by connecting members having an inverted U-section.

Although the receptacle described in the latter document makes it possible to collect a larger liquid fuel quantity, its efficiency is not as high as that of an apparatus constituted by a single tank having a limited volume. Thus, when the air volume present above the burning liquid fuel admitted into the tank is very low in the case of a single tank, said volume is increased when the tank communicates by open passages with other air-filled tanks.

Moreover, the extinction apparatus described in FR-A-2 319 392 and FR-A-2 357 267 is relatively complex and costly, the construction being such that the tanks cannot be easily disassembled for handling and subsequent treatment purposes, as is desirable particularly when the receptacle is used for extinguishing a sodium fire in a fast neutron nuclear reactor.

Finally, the construction of the covers sealing the tanks in the form of inclined plates does not permit the free circulation of operating or safety personnel.

The present invention relates to a receptacle for extinguishing burning liquid fuel by isolation constructed according to the same principle as the receptacle described in FR-A-2 357 267, whilst ensuring extinguishing with the same efficiency as if each of the tanks was unique.

The invention also relates to an extinguishing receptacle having a particularly simple construction, which is such that the tanks can easily be disassembled when at least some of them are filled with liquid fuel.

Finally, the invention also relates to an isolation-based extinguishing receptacle permitting the free circulation of operating and safety personnel above said receptacle.

The present invention therefore proposes a receptacle for extinguishing a burning liquid fuel by isolation, incorporating elementary juxtaposed reception tanks, means for joining and linking at least some of the adjacent reception tanks by at least one passage, each of the reception tanks being sealed by a cover having at least one orifice normally sealed by a first sealing member and whose opening is controlled by the dropping of liquid fuel onto the cover characterized in that said passages issue into the reception tanks in the immediate vicinity of the covers, each of the passages being normally sealed by a second sealing member, whereof the opening is controlled by a rise in the level of the liquid fuel in one of the reception tanks into which the passage issues, up to the level of said passage.

As a result of these characteristics, adjacent reception tanks are only linked when the liquid fuel substantially fills said tanks. Thus, the extinguishing effect is as fast as if there was a single reception tank. The link between the tanks solely serves as an overflow making it possible to discharge excess liquid fuel into adjacent tanks which, once filled, can be easily disengaged.

According to a preferred embodiment of the invention, each of the passages is terminated by a circular rim or edge at at least one of its ends, the second sealing member being a sphere with a density below the density of the liquid fuel to be collected, said sphere being normally maintained in tight contact with the circular rim by an appropriate application means. Preferably, said application means comprises a flexible connection member inclined with respect to a vertical direction passing through the centre of the sphere and by which the sphere is suspended on the cover of the tank.

According to a first embodiment of the invention, the cover of each of the reception tanks is funnel-shaped, the first sealing member being a sphere with a density below the density of the liquid fuel to be collected, said sphere resting by gravity in the bottom of the funnel. The sphere constituting the first sealing member can then be linked with the cover of the reception tank by a flexible connection member.

According to a second embodiment of the invention, the cover of each of the reception tanks constitutes the bottom of an elementary collecting tank of the same horizontal section as the reception tanks, means being provided for joining and linking at least some of the adjacent collecting tanks by at least one passage. This embodiment makes it possible to avoid an overflow when there is a significant leakage flowrate. In this case the reception and collecting tanks are preferably of the same dimensions, which facilitates the manufacture of the receptacle and reduces its cost.

In the preferred embodiment of the invention, the means for joining and linking adjacent tanks are eyelets having a central passage with a circular section. This characteristic makes it possible to easily disassemble the tanks by means of pliers or a cutting tool used for shearing the eyelets.

The receptacle can also be equipped with a perforated or latticed floor constituted by horizontal maintenance grids disposed either above the cover of each of the reception tanks or above the collecting tanks. Operating or safety personnel can then freely circulate above the receptacle.

Figure 1:
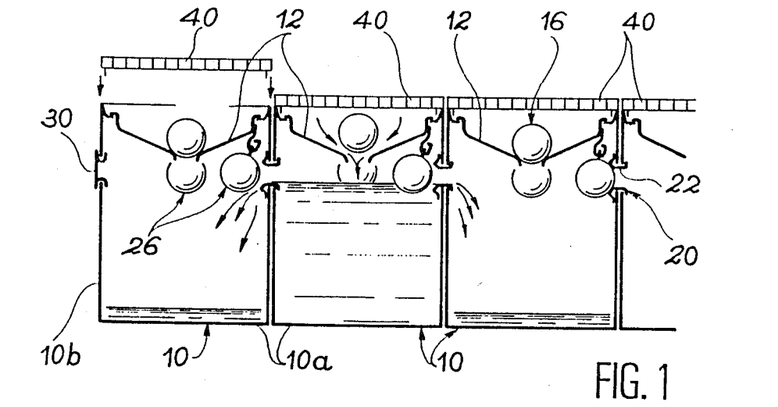
FIG. 1 A side view in vertical section of an isolating receptacle according to a first embodiment of the invention.
Figure 2:
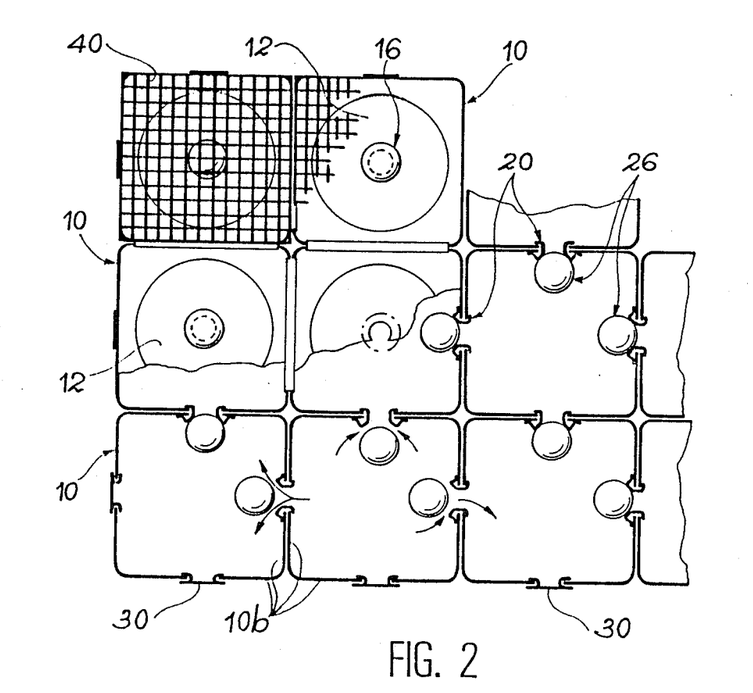
FIG. 2 A plan view in partial section of the receptacle of FIG. 1.

Two embodiments of the invention are described in non-limitative manner hereinafter relative to the drawings, wherein show:

FIGS. 1 and 2 show a receptacle according to the invention making it possible to extinguish a burning liquid fuel by rapidly isolating it from the ambient air.

As a function of the liquid fuel quantity which it is wished to receive in the receptacle, the latter has a varying number of juxtaposed, elementary reception tanks 10. Each of the elementary tanks 10 is made from thin sheet metal and comprises a planar, horizontal bottom 10a and four planar, vertical walls 10b disposed in such a way that each of the receptacles 10 has in cross-section the shape of a square, whereof the angles are rounded. Obviously, a different shape could be adopted, the cross-section of each of the boxes being possibly rectangular or hexagonal.

The elementary tanks 10 are joined by their walls 10b so as to form a receptacle, whose total surface is equal to a multiple of the section of each of the tanks.

Figure 3:
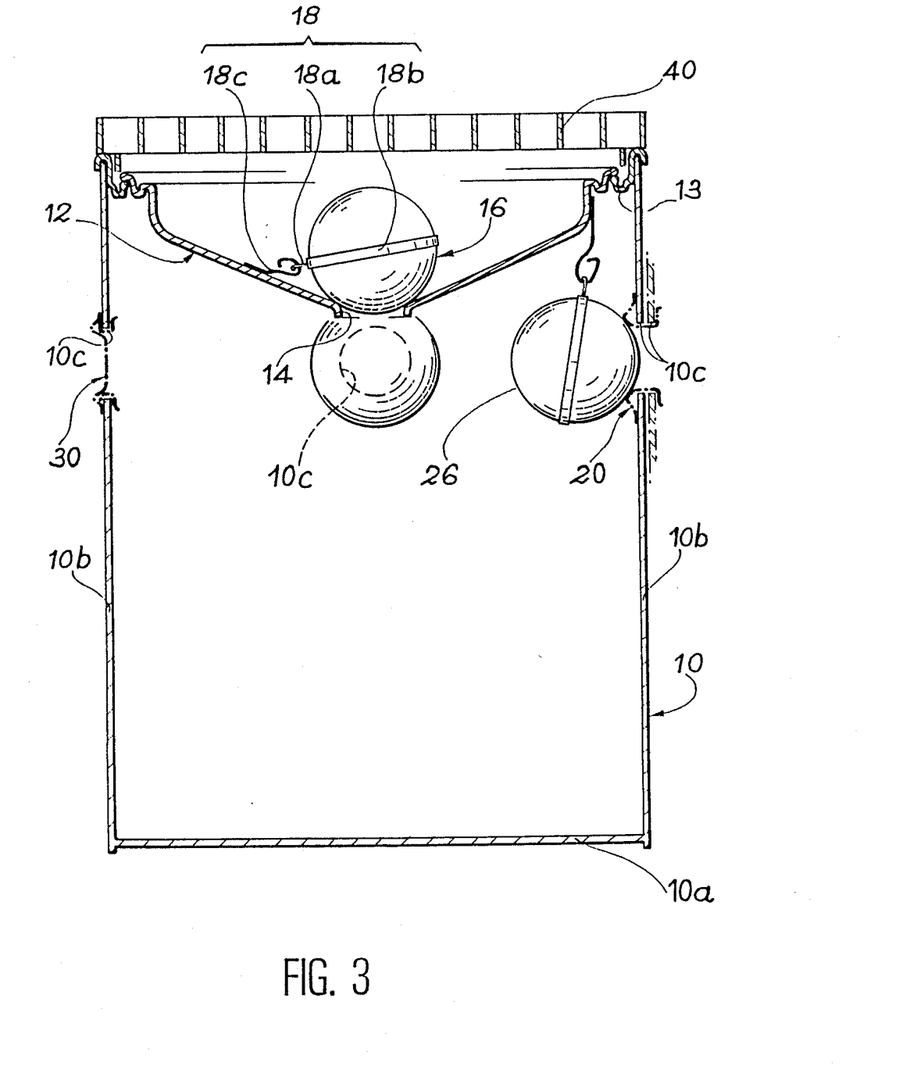
FIG. 3 A side view in vertical section showing on a larger scale one of the tanks of the receptacle of FIGS. 1 and 2.

As shown in FIGS. 1 and 3, each of the tanks 10 is sealed at its upper end by a cover 12. Covers 12 are also made from thin sheet steel, which rests on a channel 13, also made from sheet steel, which is crimped to the upper edge of vertical partitions 10b of the corresponding tank (FIG. 3).

Each of the covers 12 is shaped like a funnel making it possible to channel the liquid fuel which may be poured on to said cover towards a central orifice 14. The latter is circular and consequently defines a seat on which normally rests by gravity a sealing sphere 16. Under these conditions, orifice 14 is tightly sealed by sphere 16. The sealing spheres 16 are produced in such a way that their density is below that of the liquid fuel to be collected. They can in particular be air-filled, hollow metal spheres.

In the embodiment of FIG. 3, sphere 16 is linked with cover 12 by a flexible connecting member 18. The function of connecting member 18 is to prevent sphere 16 from escaping from the funnel formed by cover 12, but without preventing a displacement of the sphere on moving away from the seat formed about orifice 14, when liquid fuel drops on to the cover 12.

In the embodiment shown in FIG. 3, the flexible connecting member 18 comprises an attachment tab 18 formed on a ring 18b, e.g. fixed by crimping around sphere 16. Tab 18a has an opening into which is introduced and then bent back a hook formed at the end of a tongue 18c, e.g. fixed by welding to cover 12.

The thus formed connection permits a pivoting of sphere 16 and its attachment tab 18a about the hook formed at the end of tongue 18c.

Moreover, each of the vertical walls 10b of tanks 10 is perforated by a circular hole 10c. Holes 10c are all at the same level with respect to the bottom 10a of the tanks, so as to be positioned immediately below orifice 14 of the corresponding cover and as illustrated in FIG. 3. Moreover, the holes 10c are equidistant of the angles of the tank. In this way and as is more particularly illustrated in FIG. 1, when the tanks are juxtaposed with their adjacent side walls 10b, the holes 10c formed on the two adjacent walls 10b are aligned.

In order to join and link adjacent tanks 10, assembly eyelets 20 traversing adjacent walls 10b are placed in aligned holes 10c. As is more specifically illustrated by FIG. 4, each of the assembly eyelets 20 is made from thin sheet steel and has a central passage 22 with a circular section by which the adjacent tanks can communicate. At one of its ends, eyelet 20 comprises a collar or flange 20a having a circular projecting portion 20b forming a valve seat. The opposite end of eyelet 20 is turned down by crimping to form a collar or flange 20c after a washer 24 has been placed between said collar 20c and the wall 10b of the corresponding tank. As illustrated in FIG. 2, the eyelets 20 are preferably mounted in such a way that each of the tanks 10 has at the most two seats 20b, e.g. located on two adjacent walls 10b of of said tank.

According to an essential feature of the invention and as is particularly illustrated in FIG. 3, a sealing sphere 26 normally tightly bears against seat 20b formed on each of the eyelets 20. Sphere 26 has a density below the density of the liquid fuel to be collected and is applied to seat 20b by a flexible connecting member 28.

In practice, spheres 26 can be hollow spheres made from thin sheet metal and which contain air.

Figures 5, 7:
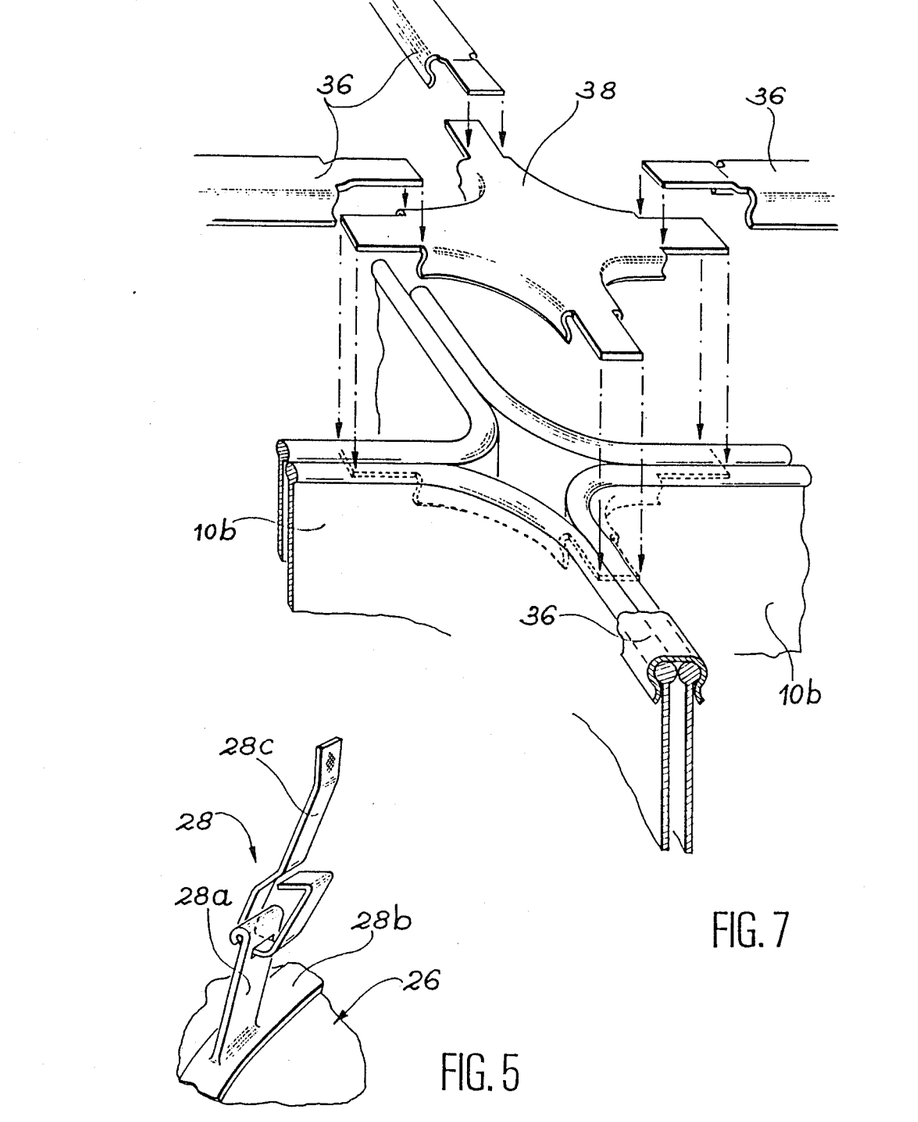
FIG. 5 A perspective view showing the flexible connecting member by which the sphere normally sealing each of the passages formed between the adjacent tanks is suspended on the cover of one of these tanks.
FIG. 7 An exploded perspective view showing the covering parts placed on the upper edges or rims of the adjacent tanks of the receptacle.

In the embodiment shown, spheres 26 are suspended on cover 12 of the corresponding tank by a connecting member 28 shown in greater detail in FIG. 5. Member 28 comprises an attachment tab 28a welded to a ring 28b surrounding a larger diameter of sphere 26 and fixed to the latter e.g. by crimping. Connecting member 28 also comprises a flexible strip 28c welded by its upper end to the periphery of cover 12 and whose lower end forms a hook traversing an opening made in tab 28a, said hook being folded on to the latter.

As shown in FIG. 3, the fixing point of strip 28c to cover 12 is displaced towards the wall 10b carrying eyelet 20 and on which bears sphere 26 attached to said strip, with respect to a vertical passing through the centre of the sphere, when the latter bears on seat 20b formed on eyelet 20.

In the previously described case where two seats 20b at the most are placed in each of the tanks 10, two spheres 26 at the most are suspended on each of the covers 12.

In the embodiment shown in the drawings, spheres 16 and 26 are completely identical. In particular, they have the same diameter and are both equipped with a ring 18b, 28b having an attachment tab 18a, 28a. Moreover, the spheres 16 and 26 are both fixed to covers 12, in such a way that the structure of tanks 10 is particularly simple.

In the represented embodiment and in order to increase the simplicity and modular nature of the elementary tanks constituting the receptacle according to the invention, tanks 10 are all identical, so that the walls 10b forming the outer periphery of the receptacle are also perforated by a hole 10c.

Figure 6:
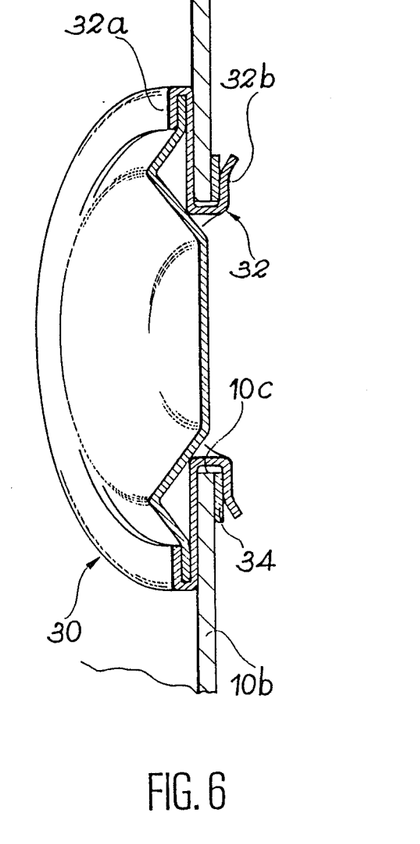
FIG. 6 A perspective, vertical sectional view identical to FIG. 4 showing a plug making it possible to seal the orifices formed on the outer walls of the tanks located at the periphery of the receptacle of FIGS. 1 and 2.

As is more particularly illustrated in FIG. 6, these holes are then sealed by plugs 30. Each of the plugs 30 can be constituted by a thin sheet metal disk, whose peripheral rim is crimped in a collar or flange 32a formed at the end of an eyelet 32 traversing the hole 10c of the wall 10b to be sealed. The opposite end of eyelet 32 is then turned down by crimping to form a collar or flange 32b, after a washer 34 has been interposed between collar 32b and wall 10b.

As illustrated in FIG. 7, when the different tanks constituting the receptacle have been assembled and connected by the eyelets 20, on the upper edges of the adjacent vertical walls 10b of the different tanks are placed covering strips 36 which simultaneously overlap the edges of the two walls.

In the represented embodiment in which the angles of the tanks 10 are rounded, angle covering portions 38 simultaneously overlap the upper edges of the rounded angles of the four adjacent tanks are also fitted.

These different covering portions 36 and 38 make it possible to ensure the outflow of the liquid fuel collected by the receptacle towards orifices 14 by funnel-shaped covers 12. Thus, there is no liquid fuel flow between the tanks.

Finally, in the embodiment shown in FIGS. 1 to 3, a horizontal maintaining grid 40 is placed on each of the tanks 10 above cover 12. It is possible to fit said grid through the construction of the covers 12 in funnel-shaped manner and by the use of sphere 16, whose diameter is smaller than the vertical displacement between orifice 14 and the upper edge of the walls 10b of said tanks.

All the maintaining grids 40 placed above the cover 12 of each of the tanks 10 thus forms a perforated or latticed floor permitting the free circulation of operating or safety personnel over the receptacle. These grids also serve as a water jet force reducing means for the liquid discharged on to the covers, consequently preventing any deterioration of the latter under the effect of a local, direct impact.

The operation of the receptacle described in exemplified manner with reference to FIGS. 1 to 7 is as follows.

In the absence of liquid fuel passing on to the receptacle, the orifices 14 formed in the covers 12 of the tanks are all sealed by spheres 16. In the same way, the passages 22 formed in eyelets 20 connecting adjacent tanks are all sealed by spheres 26.

When a burning liquid fuel is collected by certain of the tanks 10 of the receptacle according to the invention, e.g. due to a leak in a pipe carrying liquid sodium at high temperature into a fast neutron nuclear reactor, said burning liquid fuel passes through grid 40 and drops on to cover 12 of the tank or tanks in question. As a result of the funnel shape of cover 12, the liquid fuel is channelled towards the centre of the cover. As soon as the fuel level is adequate to raise the sphere 16 from the seat formed by orifice 14, bearing in mind the density difference between the sphere and the liquid fuel, the latter is admitted into the interior of the corresponding tank 10. However, the tank or tanks in question then remain isolated from adjacent tanks, because spheres 26 still seal passages 22. Consequently the atmosphere prevailing in each of these tanks is isolated from the external atmosphere and from the atmosphere contained in the other tanks of the receptacle. Therefore the fire is extinguished very rapidly by isolation.

The opening of the passages 22 formed in eyelets 20 only occurs when the liquid fuel level in tank 10 rises sufficiently for the spheres 26 disposed in said tank and sealing passages 22 issuing into said tank start to float. The spheres 26 in the adjacent tanks 10 are displaced and open the passages 22 under the action of the lateral pressure exerted by the liquid fuel of the central tank 10. Due to the slope with respect to the vertical of connecting member 28 by which each of the spheres 26 is suspended on cover 12, the floating of the sphere has the effect of moving it away from its seat 20b and consequently opens the corresponding passage 22.

In this way, the passages 22 formed in the eyelets located in the upper parts of the walls 10b in the vicinity of cover 12 fulfil an overflow function, but without reducing the efficiency of the extinguishing effect of the receptacle.

Apart from its aforementioned modular character which contributes to the great simplicity and low cost of the receptacle according to the invention, it should be noted that the sole overflow function fulfilled by passages 22, as well as the simultaneous realization of these passages and the links of the tanks between one another by means of assembly eyelets, makes it possible to relatively easily separate the different tanks.

Figure 4:
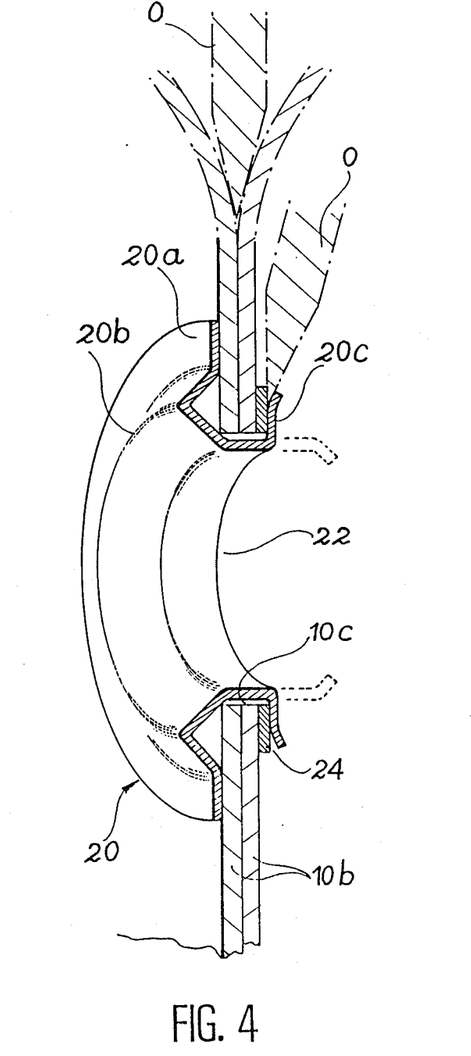
FIG. 4 A perspective, vertical sectional view showing on a larger scale one of the eyelets making it possible to join and link two adjacent tanks of the receptacle of FIGS. 1 and 2.

Two embodiments of such a separation are shown in mixed line form in FIG. 4. Thus, it is possible to see that the separation of the tanks can be carried out by means of a removal tool O introduced between adjacent walls 10b of the tanks and by means of which the eyelets 20 are cut. FIG. 4 also shows that the separation of the tanks can also be brought about by cutting the collar 20c of the eyelets using the same tool O.

Figure 8:
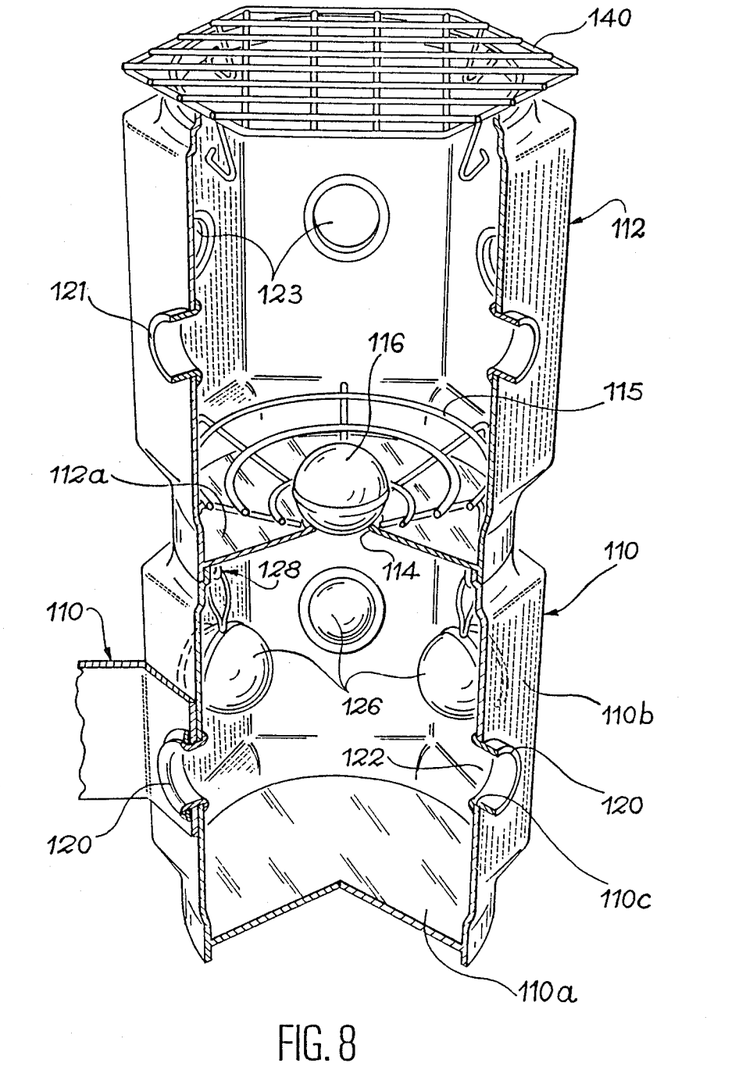
FIG. 8 An exploded perspective view illustrating a second embodiment of the invention.

FIG. 8 in an exploded perspective view illustrates another embodiment of the invention, in which the extinction receptacle comprises, apart from the adjacent reception tanks, collecting tanks placed above each of the reception tanks.

More specifically, FIG. 8 shows a reception tank 110, whose shape differs slightly from the previously described tank 10, but which has general characteristics comparable with the latter. Over most of its height, reception tank 110 has a hexagonal cross-section, which is extended upwards and downwards by two cylindrical portions. Bottom 110a of tank 110 is flat and its upper end open.

As in the last embodiment, each of the faces of the hexagonal wall 110b of reception tank 110 is perforated in its upper part by a circular hole 110c. Eyelets 120 traversing the holes 110c in the contacting faces of adjacent reception tanks make it possible to join said tanks and link them by passages 122. The latter are normally sealed by spheres 126 suspended on the upper cylindrical part of the tank wall by connecting members 128.

The embodiment of FIG. 8 mainly differs from that of FIGS. 1 to 7 by the fact that the cover of each of the reception tanks 110 constitutes the bottom 112a of a collecting tank 112 placed above the reception tank. These collecting tanks 112 are identical to the reception tanks 110, the only difference between the superimposed tanks relating to the flat disk-shaped bottom 112a of collecting tanks 112, which are centrally provided with an orifice 114, whereas the flat disk-shaped bottom 110a of the reception tanks 110 is tight.

Adjacent collecting tanks 112 are joined by eyelets 121 identical to eyelets 120, which traverse the circular holes formed in the contacting faces of these tanks. Eyelets 121 define passages 123 by which the collecting tanks 112 communicate with one another.

As in the first embodiment described, a sphere 116 with a lower density than the liquid to be extinguished normally seals orifice 114. In view of the fact that the bottom 112a of tanks 112 is flat, spheres 116 are kept in front of orifices 114 by frustum-shaped grids 115 resting on the bottom 112a of each of the collecting tanks.

In the embodiment of FIG. 8, instead of being placed above the cover of the reception tanks, the horizontal maintaining grids 140 constituting the latticed floor on which operating or safety personnel can walk, are placed above each of the collecting tanks 112.

As hereinbefore, members forming not shown deflectors cover those portions of the receptacle located between the upper cylindrical parts of the collecting tanks 112, in order to prevent any liquid flow between the tanks.

Compared with the first embodiment, the embodiment of FIG. 8 has the essential advantage of being able to collect a much large leakage flow. Thus, the collecting tanks communicating between one another prevent any overflow of liquid when the leakage flow is larger than the flow through orifices 114. Moreover, the modular nature of the collecting and reception tanks gives the receptacle a great simplicity and low cost.

Obviously the invention is not limited to the embodiments described in exemplified manner hereinbefore and covers all variants thereof.

It is clear that the floating spheres could be replaced by any other device ensuring the desired sealing action and whose opening is controlled by the rise in the liquid fuel level.

In a comparable manner, the linking and fixing of adjacent tanks can be brought about by members differing from the aforementioned eyelets, such as welded couplings or by welding.

The members ensuring the suspension of spheres 26 and 126 can be replaced by any means fulfilling the same function. For example, the spheres can be placed in channels inclined towards the wall in which the passage to be sealed is formed. The spheres are then applied by gravity to the seats, whilst the liquid level in the tank does not raise them.

Finally, several passages can also be formed between two adjacent tanks, each of these passages then being normally sealed by a sealing member. Conversely, certain adjacent tanks may not directly communicate with one another, communication instead taking place via a third tank adjacent to the two first tanks.

I claim:
1. A receptacle for extinguishing a burning liquid fuel by isolation comprising:
    a plurality of elementary separate reception tanks (10) each including a bottom (10a), side walls (10b) having a top portion and a top opening, said tanks being disposed with said side wall portions of one reception tank being in face-to-face relation with the side wall portions of adjacent reception tanks;
    a funnel-shaped cover (12) sealing said top opening of each receptacle tank and having at least one fuel admitting orifice;
    a first sealing member (16) for opening and closing said orifice including a means for opening said sealing member in response to the presence of liquid fuel in said cover;
    means for joining and linking at least some of said adjacent reception tanks in communication with each other including
        side wall openings in said top portions of at least one of said adjacent face-to-face side walls of each of two adjacent reception tanks, in open registry with each other, to provide at least one pair of aligned side wall openings,
        an eyelet surrounding each of said pairs of aligned side wall openings to define a sealable passage (22) interconnecting said top portions of adjacent reception tanks, and
        a sealing seat (20b) on said eyelet; and a second sealing member (26) mounted in each of said reception tanks for movement between a sealing position relative to said seat to seal said passage and a non-sealing position, said second sealing member normally being in said passage sealing position to limit the volume of air available to sustain burning of liquid fuel to only that available in the reception tank receiving burning fuel and only movable to said non-sealing position after liquid fuel entering said reception tank fills said tank to said top portion to permit overflow through said sealable passage.
2. Receptacle according to claim 1, wherein
each of said eyelets (22) has end portions and a terminal circular rim (20b) on at least one of said end portions comprising said seat;
said second sealing member comprises a sphere (26) having density lower than the density of the liquid fuel to be collected; and
an application means (28) is mounted in said tank to normally maintain said sphere (26) in sealing contact with said circular rim (20b).
3. A receptacle according to claim 2 wherein
said sphere has a vertical direction passing through the center thereof and
said application means includes a flexible connecting member (28) connected between said receptacle and said sphere, said connecting member inclined relative to said vertical direction toward said side wall to suspend said sphere for normal maintenance by gravity in sealing relation against said circular rim.
4. A receptacle according to claim 1, wherein said first sealing member is a sphere (16) with a density lower than the density of the liquid fuel to be collected, said sphere (16) resting by gravity in the bottom of said funnel-shaped cover.
5. A receptacle according to claim 4, wherein said first sealing member sphere is linked with said cover of its associated reception tank (10) by a flexible connecting member (18).
6. A receptacle according to claim 1, wherein said cover of each of said reception tanks (110) constitutes said bottom of a vertically adjacent elementary collecting tank (112) having the same cross-section as said reception tank; wherein said means of joining and linking at least some of the adjacent reception tanks is also provided to join at least some of said adjacent collecting tanks; and wherein said second sealing member is mounted in each of the collection tanks for movement between sealing and non-sealing positions relative to the separable passages between said collecting tanks.
7. A receptacle according to claim 6, wherein said reception (110) and collecting (112) tanks have the same dimensions.

8. A receptacle according to claim 6, wherein
said first sealing member comprises a sphere (116) having a density below the density of the liquid fuel to be collected and
said bottom (112a) of each elementary collecting tank (112) comprises a generally flat disk-like member having a centrally located orifice (114), and a frustum-shaped part (115) supported by said disk for centering said first sealing member in sealing relation to said orifice.

9. A receptacle according to claim 1, wherein said receptacle further includes a perforated floor comprising horizontal maintaining grids (40) mounted above said cover (12) of each of said reception tanks (10).

* * * * *